(12) United States Patent
He

(10) Patent No.: US 12,426,054 B2
(45) Date of Patent: Sep. 23, 2025

(54) CHANNEL PROCESSING METHOD AND ELECTRONIC DEVICE

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 533 days.

(21) Appl. No.: 17/819,427

(22) Filed: Aug. 12, 2022

(65) Prior Publication Data

US 2022/0386353 A1    Dec. 1, 2022

Related U.S. Application Data

(63) Continuation of application No. PCT/CN2020/078461, filed on Mar. 9, 2020.

(51) Int. Cl.
*H04W 4/00* (2018.01)
*H04W 72/1263* (2023.01)
*H04W 72/23* (2023.01)

(52) U.S. Cl.
CPC ....... *H04W 72/23* (2023.01); *H04W 72/1263* (2013.01)

(58) Field of Classification Search
CPC ............. H04W 72/23; H04W 72/1263; H04W 72/0446; Y02D 30/70
USPC ........................................................ 370/329
See application file for complete search history.

(56) References Cited

U.S. PATENT DOCUMENTS

| | | | | | |
|---|---|---|---|---|---|
| 4,495,849 | A | * | 1/1985 | Cooke | B23D 15/145 30/DIG. 4 |
| 4,601,059 | A | * | 7/1986 | Gammenthaler | H04W 74/00 455/527 |
| 5,617,478 | A | * | 4/1997 | Tagami | H04R 5/04 704/214 |
| 5,712,437 | A | * | 1/1998 | Kageyama | G10H 1/366 84/625 |

(Continued)

FOREIGN PATENT DOCUMENTS

| | | |
|---|---|---|
| CN | 107046722 | 8/2017 |
| CN | 108024362 | 5/2018 |

(Continued)

OTHER PUBLICATIONS

TCL Communication, "PDCCH combining strategy," 3GPP TSG RAN WG1 Meeting #93, R1-1808255, Aug. 2018.

(Continued)

*Primary Examiner* — Amancio Gonzalez
(74) *Attorney, Agent, or Firm* — Hodgson Russ LLP

(57) ABSTRACT

A channel processing method are disclosed. The method includes: receiving, by a terminal, downlink control information (DCI) and determining a timing parameter in the DCI; determining, by the terminal, a time interval between a first channel and a second channel based on the timing parameter, the first channel corresponding to at least one transmission time unit and the second channel corresponding to at least one transmission time unit; and determining, by the terminal, a transmission time unit of the first channel based on the time interval.

21 Claims, 10 Drawing Sheets

(56) References Cited

U.S. PATENT DOCUMENTS

| | | | | |
|---|---|---|---|---|
| 6,091,703 | A * | 7/2000 | Saunders | H04B 7/216 |
| | | | | 370/320 |
| 6,891,841 | B2 * | 5/2005 | Leatherbury | H04N 21/6118 |
| | | | | 398/58 |
| 9,036,580 | B2 * | 5/2015 | Yin | H04L 1/1812 |
| | | | | 370/468 |
| 9,479,301 | B2 * | 10/2016 | Papasakellariou | H04W 72/23 |
| 9,509,461 | B2 * | 11/2016 | Kim | H04W 56/0045 |
| 9,699,779 | B2 * | 7/2017 | Marinier | H04W 72/1268 |
| 9,723,464 | B2 * | 8/2017 | Patil | H04W 48/20 |
| 9,736,827 | B2 * | 8/2017 | Okino | H04W 52/244 |
| 9,894,644 | B2 * | 2/2018 | Kang | H04L 5/0094 |
| 9,942,897 | B2 * | 4/2018 | Jang | H04W 76/40 |
| 10,051,422 | B1 * | 8/2018 | Kumar | H04W 4/023 |
| 10,193,608 | B2 * | 1/2019 | Park | H04B 7/0626 |
| 10,264,437 | B2 * | 4/2019 | Poitau | H04W 76/14 |
| 10,270,570 | B2 * | 4/2019 | Liu | H04L 5/0078 |
| 10,305,571 | B2 * | 5/2019 | Liu | H04B 7/0691 |
| 10,491,335 | B2 * | 11/2019 | Rudolf | H04W 72/0446 |
| 10,555,317 | B2 * | 2/2020 | Yamada | H04B 1/7103 |
| 10,674,494 | B2 * | 6/2020 | Wang | H04L 5/0053 |
| 10,694,334 | B2 * | 6/2020 | Kumar | G01S 5/14 |
| 10,779,298 | B2 * | 9/2020 | Li | H04W 72/0446 |
| 10,797,823 | B2 * | 10/2020 | Yoshimura | H04L 1/0038 |
| 10,798,774 | B2 * | 10/2020 | Ang | H04L 5/0053 |
| 10,863,536 | B2 * | 12/2020 | Liu | H04L 5/0048 |
| 10,880,889 | B2 * | 12/2020 | Zhang | H04W 16/14 |
| 10,925,095 | B2 * | 2/2021 | Park | H04W 74/006 |
| 11,009,580 | B2 * | 5/2021 | Marshall | G01S 5/0018 |
| 11,064,514 | B2 * | 7/2021 | Hosseini | H04W 72/56 |
| 11,071,107 | B2 * | 7/2021 | Kalhan | H04W 72/04 |
| 11,139,877 | B2 * | 10/2021 | Lee | H04W 72/23 |
| 11,246,117 | B2 * | 2/2022 | Ying | H04W 72/04 |
| 11,265,901 | B2 * | 3/2022 | Freda | H04W 28/0268 |
| 11,283,551 | B2 * | 3/2022 | Lee | H04L 5/00 |
| 11,284,400 | B2 * | 3/2022 | Zhou | H04W 24/08 |
| 11,304,190 | B2 * | 4/2022 | Yang | H04L 5/0094 |
| 11,309,988 | B2 * | 4/2022 | Marinier | H04L 5/0044 |
| 11,611,959 | B2 * | 3/2023 | Fu | H04W 72/20 |
| 11,695,516 | B2 * | 7/2023 | Huang | H04L 1/1864 |
| | | | | 370/312 |
| 11,706,787 | B2 * | 7/2023 | Shi | H04W 72/53 |
| | | | | 370/329 |
| 11,729,753 | B2 * | 8/2023 | Marinier | H04L 5/0092 |
| | | | | 370/329 |
| 11,743,874 | B2 * | 8/2023 | Shin | H04L 5/0044 |
| | | | | 370/329 |
| 11,758,558 | B2 * | 9/2023 | Takeda | H04W 72/53 |
| | | | | 370/329 |
| 11,863,302 | B2 * | 1/2024 | Freda | H04L 5/0055 |
| 12,101,719 | B2 * | 9/2024 | Freda | H04L 5/0053 |
| 12,185,359 | B2 * | 12/2024 | Yin | H04W 72/569 |
| 2015/0003351 | A1 * | 1/2015 | Park | H04J 1/02 |
| | | | | 370/329 |
| 2019/0297577 | A1 * | 9/2019 | Lin | H04W 52/0235 |
| 2020/0053750 | A1 | 2/2020 | Vos | |
| 2020/0267700 | A1 * | 8/2020 | Hosseini | H04L 1/1812 |
| 2022/0007399 | A1 * | 1/2022 | Rastegardoost | H04L 5/0073 |
| 2024/0305367 | A1 * | 9/2024 | Ang | H04W 72/1263 |

FOREIGN PATENT DOCUMENTS

| | | |
|---|---|---|
| CN | 110536459 | 12/2019 |
| CN | 110740016 | 1/2020 |
| WO | 2017133339 | 8/2017 |

OTHER PUBLICATIONS

EPO, Extended European Search Report for EP Application No. 20924603.2, Feb. 28, 2023.

CNIPA, First Office Action for CN Application No. 202211643823. 7, Jun. 24, 2024.

"3rd Generation Partnership Project; Technical Specification Group Radio Access Network; NR; Physical layer procedures for data (Release 15)," 3GPP TS 38.214 Sep. 2018, v15.3.0.

"3rd Generation Partnership Project; Technical Specification Group Radio Access Network; NR; Radio Resource Control (RRC) protocol specification (Release 15)," 3GPP TS 38.331, Sep. 2018, v15.3.0.

"3rd Generation Partnership Project; Technical Specification Group Radio Access Network; NR; Physical layer procedures for control (Release 15)," 3GPP TS 38.213, Sep. 2018, v15.3.0.

"3rd Generation Partnership Project; Technical Specification Group Radio Access Network; NR; Multiplexing and channel coding (Release 15)," 3GPP TS 38.212, Sep. 2018, v15.3.0.

Nokia Networks et al., "Timing Relationships for NB-IoT," 3GPP TSG-RAN WG1 Meeting #84, R1-160463, Feb. 2016.

Intel Corporation, "Timing Relationships for NB-IoT," 3GPP TSG RAN WG1 Meeting #84, R1-160417, Feb. 2016.

WIPO, International Search Report and Written Opinion for PCT/CN2020/078461, Dec. 7, 2020.

EPO, European Examination Report for European Application No. 20924603.2, Nov. 17, 2023.

* cited by examiner

CHANNEL PROCESSING METHOD AND ELECTRONIC DEVICE

CROSS REFERENCE TO RELATED APPLICATIONS

The present application is a continuation of International Patent Application No. PCT/CN2020/078461, filed Mar. 9, 2020, the entire disclosure of which is incorporated herein by reference.

TECHNICAL FIELD

The present disclosure relates to the field of communication, and in particular to a method and an apparatus for processing a channel, a storage medium, and an electronic device.

BACKGROUND

Currently, a user equipment (UE), which supports a low bandwidth capability, usually has low power consumption and low costs. Further, in order to ensure coverage, repeated transmission may be performed in channels. That is, transmission may be performed in a plurality of transmission time units. However, a timing relationship defined in the New Radio (NR) system in the art cannot be applied to the scenario of repeated transmission of channels. When repeated transmission of channels is introduced in a NR-light system, timing relationships between various channels need to be reconsidered. In this way, there may be a technical problem that when repeated transmission is performed in channels, the transmission time units of channels cannot be determined accurately.

Till now, there is no effective technical solution provided to solve the above technical problem.

SUMMARY OF THE DISCLOSURE

According to an aspect of the present disclosure, a channel processing method is provided and includes: receiving, by a terminal, downlink control information (DCI) and determining a timing parameter in the DCI; determining, by the terminal, a time interval between a first channel and a second channel based on the timing parameter, the first channel corresponding to at least one transmission time unit and the second channel corresponding to at least one transmission time unit; and determining, by the terminal, a transmission time unit of the first channel based on the time interval.

According to an aspect of the present disclosure, another channel processing method is provided and includes: determining, by a network device, a timing parameter in DCI; determining, by the network device, a time interval between a first channel and a second channel based on the timing parameter, the first channel corresponding to at least one transmission time unit and the second channel corresponding to at least one transmission time unit; and determining, by the network device, a transmission time unit of the first channel based on the time interval.

According to an aspect of the present disclosure, an electronic device is provided and includes a memory and a processor. The memory has a computer program stored therein, the processor is configured to run the computer program to perform the channel processing method of any one of above aspects.

BRIEF DESCRIPTION OF THE DRAWINGS

The accompanying drawings illustrated herein are used to provide a further understanding of the present disclosure and form a part of the present disclosure. The illustrative embodiments of the present disclosure and descriptions thereof are used to explain the present disclosure and do not form an undue limitation of the present disclosure.

DETAILED DESCRIPTION

Figure 1:
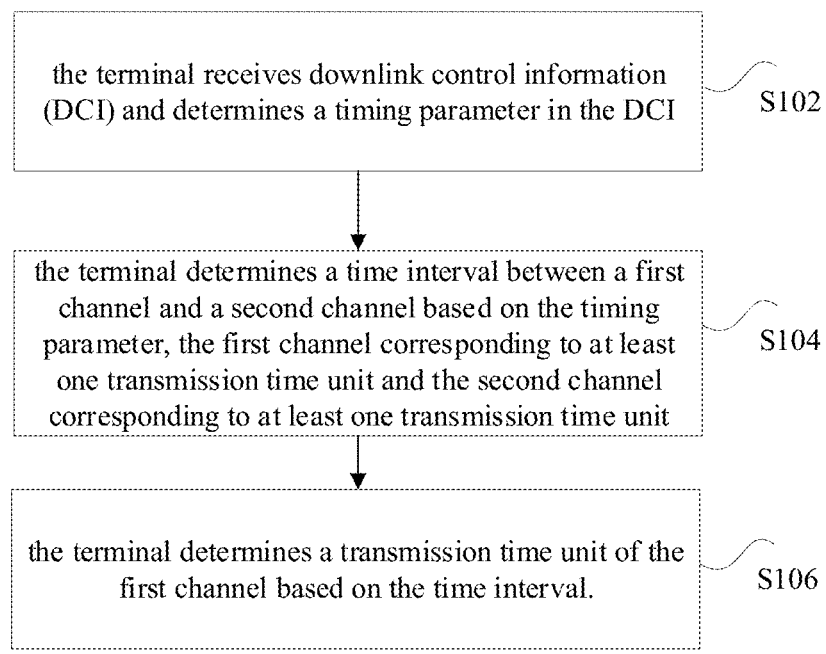
FIG. 1 is a flow chart of a channel processing method according to an embodiment of the present disclosure.

In order to enable ordinary skilled persons in the art to better understand solutions of the present disclosure, technical solutions in the embodiments of the present disclosure will be described clearly and completely by referring to the accompanying drawings in the embodiments of the present disclosure. The described embodiments are only a part of but not all of the embodiments of the present disclosure. Based on the embodiments of the present disclosure, all other embodiments obtained by any ordinary skilled person in the art without creative work shall fall within the scope of the present disclosure. To be noted that terms "first" and "second" in the description and claims of the present disclosure and the above-mentioned drawings are used to distinguish similar components, and not used to describe a specific sequence or order. To be understood that data used in this way can be interchanged under appropriate circumstances, such that the embodiments of the present disclosure described herein can be implemented in a sequence other than the sequence described herein. Terms "including", "having", and any variations thereof are intended to cover non-exclusive inclusions. For example, a series of operations or units included in a process, a method, a system, a product, or a device are not limited to those clearly listed. Those operations or units may include other steps or units that are not clearly listed or are inherent to the process, the method, the system, the product, or the device.

Technical solutions of the embodiments of the present disclosure may be applied to various communication systems, such as: a Global System of Mobile Communication (GSM) system, a Code Division Multiple Access (CDMA) system, a Wideband Code Division Multiple Access (WCDMA) system, a general packet radio service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system or a 5G system, and so on. The communication system for the embodiments of the present disclosure may include a network device, and the network device may be a device that communicates with a terminal device (or named as a communication terminal or a terminal). The network device may provide a communication coverage for a specific geographic area, and may communicate with a terminal device located in the coverage area. Alternatively, the network device may be a base transceiver station (BTS) in the GSM system or the CDMA system, or a base station (NodeB, referred to as NB) in the WCDMA system, or an evolutional NodeB (eNB or eNodeB) in the LTE system, or a wireless controller in a cloud radio access network (CRAN). Alternatively, the network device may be a mobile switching center, a relay station, an access point, a vehicle-mounted device, a wearable device, a hub, a switcher, a bridge, a router, a network device in the 5G network, or a network device in a future evolutional public land mobile network (PLMN), and so on.

The communication system further includes at least one terminal device located within the coverage area of the network device. As used herein, the "terminal device" includes, but is not limited to, connection via wired lines, such as via public switched telephone networks (PSTN), Digital Subscriber Line (DSL), digital cables, and direct cable connections; and/or another data connection/network; and/or via a wireless interface, such as for cellular networks, wireless local area networks (Wireless Local Area Network, referred to as WLAN), digital TV networks such as DVB-H networks, satellite networks, AM-FM broadcasting transmitter; and/or a device of another terminal device configured to receive/send communication signals; and/or an Internet of Things (IoT) device. A terminal device set to communicate through a wireless interface may be referred to as a "wireless communication terminal", a "wireless terminal" or a "mobile terminal". Examples of the mobile terminal may include, but are not limited to, satellite or cellular phones; Personal Communications System (PCS) terminals that can combine cellular radio phones with data processing, fax, and data communication capabilities; a PDA that can include a radio phone, a pager, Internet/intranet access, a Web browser, a memo pad, a calendar, and/or a Global Positioning System (GPS) receiver; and a conventional laptop and/or palmtop receiver or other devices including radio telephone transceivers. The terminal device may refer to an access terminal, a user equipment (UE), a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a wireless local loop (WLL) station, a personal digital assistant (PDA), a handheld device having wireless communication functions, a computing device or other processing devices connected to a wireless modem, a vehicle-mounted device, a wearable device, a terminal device in the 5G network, or a terminal device in the future evolutional PLMN, and so on.

Alternatively, D2D communication may be performed between terminal devices. Alternatively, the 5G system or the 5G network may also be referred to as an NR system or an NR network. Alternatively, the communication system may further include a network controller, a mobility management entity, and other network entities, which will not be limited by embodiments of the present disclosure. To be understood that the device having the communication function in the network/system in the embodiments of the present disclosure may be referred to as a communication device. The communication device may include a network device and a terminal device having communication functions. The network device and the terminal device may be the device described above, which will not be repeated herein. The communication device may further include other devices in the communication system, such as a network controller and other network entities such as a mobile management device, which will not be limited by the embodiments of the present disclosure. To be understood that terms "system" and "network" in the present disclosure may be used interchangeably. The term "and/or" in present disclosure describes only an associated relationship between the related objects, and may indicate three types of relationships. For example, A and/or B may indicate three situations: A alone is present, A and B are present at the same time, and B alone is present. In addition, the character "/" in the present disclosure indicates that associated objects before and after the character are in an "or" relationship.

According to an embodiment of the present disclosure, a channel processing method is provided. Operations illustrated in the flow chart of the accompanying drawings can be performed in a computer system such as a set of computer-executable instructions. Although a logical sequence is illustrated in the flow chart, in some cases, the operations illustrated or described can be performed in another order different from the order shown herein. The channel processing method of a terminal device of the embodiment of the present disclosure is described below. FIG. 1 is a flow chart of a channel processing method according to an embodiment of the present disclosure. As shown in FIG. 1, the method includes following operations.

In an operation S102, the terminal receives downlink control information (DCI) and determines a timing parameter in the DCI. The terminal may receive the DCI sent by a network device. The DCI may carry the timing parameter of a channel. That is, the DCI may indicate the timing parameter, and the timing parameter may be referred to as timing indication information. After receiving the DCI, the terminal determines the above timing parameter from the DCI.

In an operation S104, the terminal determines a time interval between a first channel and a second channel based on the timing parameter. The first channel corresponds to at least one transmission time unit, and the second channel corresponds to at least one transmission time unit. The time interval may be a timing offset between the transmission time unit in the first channel and the transmission time unit in the second channel, and may be configured to determine a timing relationship between the first channel and the second channel. The transmission time unit is also referred to as a transmission time slot. The first channel corresponds to at least one transmission time unit. That is, the first channel is configured with a repeated transmission mechanism. The second channel corresponds to at least one transmission time unit. That is, the second channel is also configured with a repeated transmission mechanism.

Alternatively, in the present embodiment, the first channel may be a Physical Downlink Shared Channel (PDSCH), and the second channel may be a Physical Downlink Control Channel (PDCCH). Alternatively, the first channel may be a Physical Uplink Shared Channel (PUSCH), and the second channel may be the PDCCH. Alternatively, the first channel may be a Physical Uplink Control Channel (PUCCH), and the second channel may be the PDSCH.

In an operation S106, the terminal determines a transmission time unit of the first channel based on the time interval. The transmission time unit of the first channel is a first transmission time unit of the at least one transmission time unit corresponding to the first channel. The determined transmission time unit of the first channel may be referred to as a timing of the first channel, such as a transmission timing of the first channel.

Alternatively, after the terminal determines the transmission time unit of the first channel, the terminal determines reception time of the first channel based on the transmission time unit of the first channel. Further, the terminal receives data through the first channel based on the reception time. For example, the first channel may be the PDSCH. Alternatively, the terminal may determine transmission time of the first channel based on the transmission time unit of the first channel. Further, the terminal may transmit data through the first channel based on the transmission time. For example, the first channel may be the PUSCH or the PUCCH. Alternatively, in the NR system, the time interval between the first channel and the second channel is determined by the timing parameter, and the timing parameter is indicated via the DCI. Therefore, the time interval may be dynamically variable.

According to the above operations S102 to S106 of the present disclosure, retransmission mechanism of the channel is applied to determine the timing parameter indicated in the DCI. In this way, the terminal may correctly determine the transmission time unit of the corresponding channel in the scenario of repeated transmission of the channel. The terminal having the low bandwidth capability may be adapted. The technical problem that that when repeated transmission is performed in channels, the transmission time units of channels cannot be determined accurately, may be solved. Therefore, when repeated transmission is performed in channels, the transmission time units of channels can be determined accurately.

The method of present embodiment will be illustrated in more details in the following.

In an implementation, for the operation S104, the terminal determining the time interval between the first channel and the second channel based on the timing parameter, includes following operations. The terminal determines a time interval between at least one first transmission time unit of the at least one transmission time unit corresponding to the first channel and at least one second transmission time unit of the at least one transmission time unit corresponding to the second channel based on the timing parameter. The at least one first transmission time unit in the at least one transmission time unit corresponding to the first channel may be any transmission time unit in the at least one transmission time unit corresponding to the first channel, such as, may be a first transmission time unit in the at least one transmission time unit corresponding to the first channel. Alternatively, in the present embodiment, the at least one first transmission time unit may be referred as a full set, relating to transmission information of the first channel. The at least one second transmission time unit of the at least one transmission time unit corresponding to the second channel may be any transmission time unit of the at least one transmission time unit corresponding to the second channel, such as, may be a last transmission time unit of the at least one transmission time unit corresponding to the second channel. Alternatively, the terminal may determine a time interval between the at least one first transmission time unit and at least one second transmission time unit in the at least one transmission time unit, based on the timing parameter.

In an implementation, the method further includes following operations. The terminal determines the at least one transmission time unit corresponding to the second channel based on transmission information of the second channel. In the present embodiment, the transmission information of the second channel may be determined, and the transmission information may be channel retransmission information. The at least one transmission time unit corresponding to the second channel may correspond to the transmission information of the second channel. The terminal may determine the at least one transmission time unit corresponding to the second channel based on the transmission information of the second channel.

In an implementation, for the operation S106, the terminal determining the transmission time unit of the first channel based on the time interval, may include following operations. The terminal determines the transmission time unit of the first channel based on the time interval and the transmission information of the second channel. In the present embodiment, the terminal may determine the transmission time unit of the first channel based on the timing parameter and the transmission information of the second channel. For example, the transmission time unit of the first channel may be the first transmission time unit of the at least one transmission time unit corresponding to the first channel. Since the timing parameter enables the time interval between the first channel and the second channel to be determined, the transmission time unit of the first channel may further be determined based on the time interval and the transmission information of the second channel, and that is, the transmission timing of the first channel may be determined.

In an implementation, the transmission information of the second channel includes: the first number of the at least one transmission time unit corresponding to the second channel, and a first transmission time unit of the at least one transmission time unit corresponding to the second channel. The terminal determining the transmission time unit of the first channel based on the time interval and the transmission information of the second channel may include following operations. The terminal determines at least one second transmission time unit based on based on the first number and the first transmission time unit of the at least one transmission time unit corresponding to the second channel. The terminal determines at least one transmission time unit from the at least one first transmission time unit based on the time interval and at least one transmission time unit from the at least one second transmission time unit. The terminal determines the at least one of the at least one first transmission unit as the transmission time unit of the first channel.

In the present embodiment, the transmission information of the second channel may include the first number of the at least one transmission time unit corresponding to the second channel, i.e., the number of repeated transmissions of the second channel. The transmission information of the second channel may further include the first transmission time unit of the at least one transmission time unit corresponding to the second channel, i.e., a stating time slot of the repeated transmissions of the second channel. The terminal of the present embodiment may determine at least one second transmission time unit of the at least one transmission time unit corresponding to the second channel based on the first number and the first transmission time unit of the at least one transmission time unit corresponding to the second channel. For example, the at least one second transmission time unit may be the last transmission time unit of the at least one transmission time unit corresponding to the second channel. The terminal may determine at least one of the at least one first transmission time unit based on the time interval and the at least one of the at least one second transmission time unit. The at least one second transmission time unit and the at least one first transmission time unit may be understood as a full set. Alternatively, at least one of the at least one second transmission time units may be the last transmission time unit of the at least one transmission time unit corresponding to the second channel. The at least one of the at least one first transmission time unit may be the first transmission time unit of the at least one transmission time unit corresponding to the first channel. The terminal may determine the at least one of the at least one first transmission time unit as the transmission time unit of the first channel of the present embodiment.

In an implementation, the terminal determining at least one of the at least one first transmission time unit based on the time interval and at least one of the at least one second transmission time unit, may include following operations. The terminal may determine whether the transmission time unit belongs to a time unit set, and the transmission time unit may be obtained based on the time interval and the at least one of the at least one second transmission time unit. In response to the obtained transmission time unit belonging to the time unit set, the terminal may determine the obtained transmission time unit as the at least one transmission time unit in the at least one first transmission time unit. In response to the obtained transmission time unit not belonging to the time unit set, the terminal may determine a transmission time unit after the obtained transmission time unit, which belongs to the time unit set, as the at least one transmission time unit in the at least one first transmission time unit.

In the present embodiment, the terminal may calculate the transmission time unit based on the time interval and the at least one of the at least one second transmission time unit. For example, the terminal may calculate the transmission time unit based on the time interval and the last transmission time unit of the at least one transmission time unit corresponding to the second channel. The calculated transmission time unit cannot yet be determined as the at least one of the at least one first transmission time unit. It further needs to be determined whether the calculated transmission time unit belongs to the time unit set, and the time unit set may be a time slot set. In response to the calculated transmission time unit being determined as belonging to the time unit set, the terminal may determine the calculated transmission time unit directly as the at least one of the at least one first transmission time unit. Alternatively, in response to the calculated transmission time unit being determined as not belonging to the time unit set, the terminal may determine a transmission time unit after the calculated transmission time unit, which belongs to the time unit set, as the at least one of the at least one first transmission time unit. For example, a transmission time unit after the calculated transmission time unit, which belongs to the transmission time unit set, may be determined as the first transmission time unit of the at least one transmission time unit corresponding to the first channel.

In an implementation, when the first channel is the PDSCH, and the second channel is the PDCCH, the time unit set may be a first time unit set. The first time unit set may be a set of available downlink time units. In the present embodiment, the first time unit set may be referred to as a first time slot set. The first time slot set may be a set of downlink time slots available for the NR-light system. The time slot set may be obtained through high-layer configuration information. For example, the time slot set may be obtained through Radio Resource Control (RRC) signaling, system messages, broadcast messages, and so on. In a Time Division Duplex (TDD) system, the first time unit set may be related to configuration of time slots (slots) in the uplink and the downlink. Alternatively, the PDCCH belongs to the first time unit set.

In an implementation, when the first channel is the PUSCH, and the second channel is the PDCCH, or when the first channel is the PUCCH, and the second channel is the PDSCH, the time unit set may be a second time unit set. The second time unit set may be a set of available uplink time units. In the present embodiment, the second time unit set may be referred to as a second time slot set. The second time slot set may be a set of uplink time slots available for the NR-light system and may be obtained through high-layer configuration information. For example, the second time slot set may be obtained through RRC signaling, system messages, broadcast messages, and so on. Alternatively, the PDCCH belongs to the first time unit set. Alternatively, the PDSCH belongs to the first time unit set.

In the present embodiment, the transmission information of the second channel may include the first transmission time unit of the at least one transmission time unit corresponding to the second channel. A method for determining the first transmission time unit of the at least one transmission time unit will be described below. In an embodiment, the terminal obtains the first transmission time unit in the at least one transmission time unit corresponding to the PDCCH through high-layer signaling and/or the DCI, when the first channel is the PDSCH and the second channel is the PDCCH, or when the first channel is the PUSCH and the second channel is the PDCCH. In the present embodiment, the first channel may be the PDSCH, and the second channel may be the PDCCH. Alternatively, the first channel may be the PUSCH, and the second channel may be the PDCCH. In both situations, the second channel may be the PDCCH, and the first transmission time unit of the at least one transmission time unit corresponding to the PDCCH included in the transmission information of the second channel may be determined via at least one of the high-layer signaling and the DCI. In this way, the starting time slot for repeated transmission of the PDCCH may be determined.

In an implementation, the method further includes following operations. When the first channel is the PUCCH and the second channel is the PDSCH, the terminal may determine the first transmission time unit in the at least one transmission time unit corresponding to the PDCCH, based on transmission information of the PDCCH and the time interval between the last transmission time unit in the at least one transmission time unit corresponding to the PDCCH and the first transmission time unit of the at least one transmission time unit corresponding to the PDSCH. The transmission information of the PDCCH may include the first number of the at least one transmission time unit corresponding to the PDCCH, and the first transmission time unit of the at least one transmission time unit corresponding to the PDCCH.

The terminal may determine the last transmission time unit of the at least one transmission time unit corresponding to the PDCCH, based on the first number of the at least one transmission time units corresponding to the PDCCH and the first transmission time unit of the at least one transmission time unit corresponding to the PDCCH. Further, the terminal may obtain the first transmission time unit of the at least one transmission time unit corresponding to the PDSCH, based on the time interval between the last transmission time unit in the at least one transmission time unit corresponding to the PDCCH and the first transmission time unit in the at least one transmission time unit corresponding to the PDSCH, and based on the first transmission time unit in the at least one transmission time unit corresponding to the PDSCH.

In an implementation, the method may further include following operations. The terminal may obtain the first number through the high-layer signaling and/or the DCI. In the present embodiment, the transmission information of the second channel may include the first number of at least one transmission time unit corresponding to the second channel. Regardless of the first and second channels being the PDSCH and PDCCH respectively, or, being the PUSCH and the PDCCH respectively, or, being the PUCCH and the PDSCH respectively, the first number may be determined based on at least one of the high-layer signaling and the DCI.

In an implementation, the DCI carried by the PDCCH may include a timing parameter. The second number of transmission time units may be present between the at least one of the at least one first transmission time unit and the at least one of the at least one second transmission time unit. Time parameters in DCIs carried by the PDCCH in at least two transmission time units may be identical, and the timing parameter may be the second number. Alternatively, timing parameters in DCIs carried by the PDCCH in at least two transmission time units may be different, and the second number may be determined based on at least one of the different timing parameters. The second number of transmission time units may be present between the at least one of the at least one first transmission time unit and the at least one of the at least one second transmission unit. The second number may be the number of transmission time units between the first transmission time unit of the at least one transmission time unit corresponding to the first channel and the last transmission time unit of the at least one transmission time unit corresponding to the second channel. In the present embodiment, timing parameters in the DCIs carried by the PDCCH in at least two transmission time units being identical may refer to the timing parameters in the DCI in each transmission time unit being identical, and the timing parameters may be the second number. Alternatively, timing parameters in DCIs carried by the PDCCH in at least two transmission time units may be different, and in this situation, the second number may be determined based on at least one of the different timing parameters.

In an implementation, for the operation S104, the terminal determining the time interval between the first channel and the second channel based on the timing parameter, includes following operations. The terminal may determine time corresponding to the second number as the time interval. In the present embodiment, the timing parameter may be the second number. The terminal determining the time interval between the first channel and the second channel based on the second number may refer to the terminal determining the time corresponding to the second number as the time interval.

In an implementation, the second number may be the minimum number of transmission time units between the at least one transmission time unit in the at least one first transmission time unit and the at least one transmission time unit in the at least one second transmission unit. The second number included in the DCI carried by the PDCCH may be the minimum number of transmission time units between the first transmission time unit in the at least one transmission time unit corresponding to the first channel and the last transmission time unit in the at least one transmission time unit corresponding to the second channel, i.e., the minimum number of time slots. When the first channel is the PDSCH and the second channel is the PDCCH, the actual second number is related to the timing parameter and the first time unit set. When the first channel is the PUSCH and the second channel is the PDCCH, or when the first channel is the PUCCH and the second channel is the PDSCH, the actual second number is related to the timing parameter and the second time unit set.

In the above method, the at least one first transmission time unit may be the first transmission time unit of the at least one transmission time unit corresponding to the first channel, and the at least one second transmission unit may be the last transmission unit of the at least one transmission time unit corresponding to the second channel. The method will be further described below in terms of the first and second channels being: the PDSCH and the PDCCH respectively; or being the PUSCH and the PDCCH respectively; or being the PUCCH and the PDSCH respectively.

In an implementation, the first channel may be the PDSCH, and the second channel may be the PDCCH. The transmission time unit of the PDSCH may be determined based on the transmission information and the timing parameter of the PDCCH. An interval between a last subframe of the MTC transmission in the art and a first subframe of the PDSCH is predefined. In the NR system, a time interval between a time slot of the PDCCH transmission and a time slot of the PDSCH transmission is indicated by the DCI, and therefore, the time interval is dynamically variable.

Figure 2:
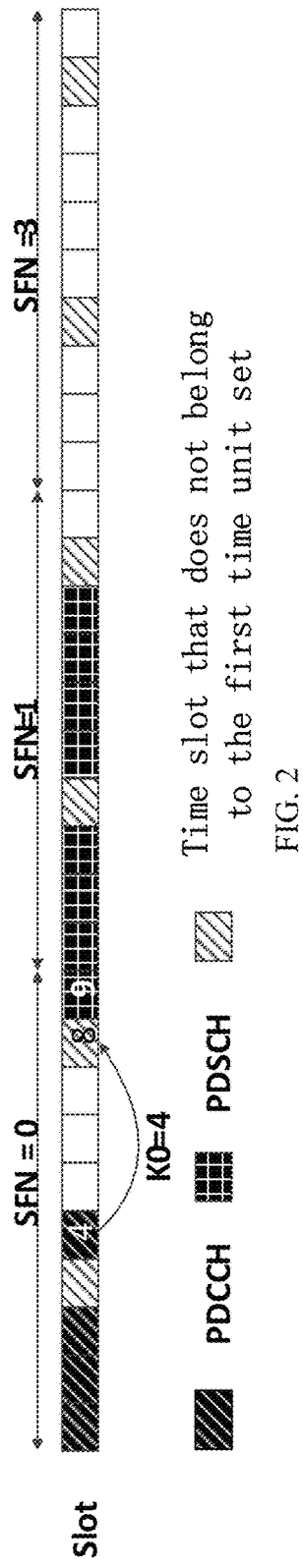
FIG. 2 is a schematic view of determining a first transmission time unit from a plurality of transmission time units corresponding to a PDSCH according to an embodiment of the present disclosure.

In the present embodiment, the first transmission time unit of the PDSCH transmission may be determined based on the first transmission time unit of the repeated transmission of the PDCCH, the number of repeated transmissions, and the timing parameter K0 included in the DCI carried by the PDCCH. The timing parameter K0 may be the number of transmission time units between the last transmission time unit of the repeated transmissions of the PDCCH and the first transmission time unit of the repeated transmissions of the PDSCH. FIG. 2 is a schematic view of determining a first transmission time unit from a plurality of transmission time units corresponding to a PDSCH according to an embodiment of the present disclosure. As shown in FIG. 2, the timing parameter K0=4. When the transmission time unit is determined to be a time slot of 8 based on the first transmission time unit of the repeated transmissions of the PDCCH, the number of repeated transmissions, and the timing parameter K0 included in the DCI carried by the PDCCH, and when the time slot 8 does not belong to the first time unit set, the first time unit set of the PDSCH transmission may be determined to be in a time slot after the time slot 8 and belonging to the first time unit set, i.e., a time slot 9. Alternatively, the timing parameter K0 included in the DCI carried by the PDCCH may be the minimum number between the last transmission time unit of the PDCCH transmission and the first transmission time unit of the PDSCH transmission. The actual number of transmission time units may be related to the timing parameter K0 and the first time unit set.

In an implementation, the first channel may be the PUSCH and the second channel may be the PDCCH. Timing of the PUSCH channel may be determined based on the transmission information and the timing parameter of the PDCCH. In the MTC system in the art, when the MPDCCH is configured with repeated transmission, an interval between a first subframe of the PUSCH transmission scheduled by the MPDCCH and a last subframe of the MPDCCH transmission is 4 in the Frequency Division Duplex (FDD) system. The interval may be determined in the TDD system based on configuration of the uplink and the downlink. The interval between the last subframe of the MPDCCH transmission and the first subframe of the PDSCH is predefined. In the NR system, a time interval between a time slot of the PDCCH transmission and a time slot of the PUSCH transmission is indicated by the DCI, and therefore, the time internal is dynamically variable.

Figure 3:
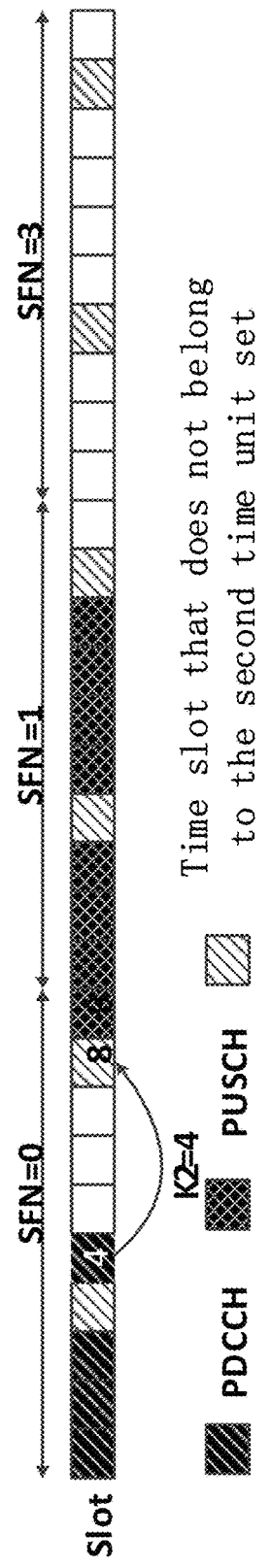
FIG. 3 is a schematic view of determining a first transmission time unit from a plurality of transmission time units corresponding to a PUSCH according to an embodiment of the present disclosure.

In the present embodiment, transmission time units of the PDCCH belong to the first time unit set, and transmission time units of the PUSCH belong to the second time unit set. A first transmission time unit of the PDSCH transmission may be determined based on the first transmission time unit of repeated transmissions of the PDCCH, the number of repeated transmissions of the PDCCH, and a timing parameter K2 included in the DCI carried by the PDCCH. The timing parameter K2 may be the number of transmission time units between the last transmission time unit of the PDCCH transmission and a first transmission time unit of the PUSCH transmission. The last transmission time unit of the PDCCH may be determined based on the first transmission time unit of repeated transmissions of the PDCCH and the number of repeated transmissions. FIG. 3 is a schematic view of determining a first transmission time unit from a plurality of transmission time units corresponding to a PUSCH according to an embodiment of the present disclosure. As shown in FIG. 3, the timing parameter K2=4. The first transmission time unit of the PUSCH may be determined as a time slot 8, but the time slot 8 does not belong to the second time unit set. In this situation, the first transmission time unit of the PUSCH may be determined to be a time slot, which is after the time slot 8 and belongs to the second time unit set, i.e., a time slot 9. Alternatively, the timing parameter K2 included in the DCI carried by the PDCCH may be the minimum number of transmission time units between the last transmission time unit of the PDCCH transmission and the first transmission time unit of the PUSCH transmission. The actual number of transmission time units may be related to the timing parameter K2 and the second time unit.

In an implementation, the first channel may be the PUCCH and the second channel may be the PDSCH. A transmission time unit of the PUCCH may be determined based on transmission information and a timing parameter of PDSCH. In the MTC system in the art, in an FDD mode, when the MPDCCH is configured with repeated transmissions, the PDSCH transmission scheduled by MPDCCH starts at the 2nd BL/CE downlink subframe after the last subframe of the MPDCCH transmission. Further, in response to the PDSCH transmitting in a subframe n, a corresponding HARQ-ACK information is carried on the PUCCH sent in a subframe n+4. In the NR system, a time interval between the transmission time unit of the PDSCH and a time slot of the PUCCH transmission carrying the HARQ-ACK information corresponding to the PDSCH is indicated by the DCI, and therefore, the time interval is dynamically variable.

In the present embodiment, the first transmission time unit of the PUCCH transmission may be determined based on the first repeated transmission time unit of the PDSCH, the number of repeated transmissions, and the K1 information included in the DCI carried by the PDSCH. Alternatively, the timing parameter K1 included in the DCI may be the number of transmission time units between the last transmission time unit of the PDSCH transmission and the first transmission time unit of the PUCCH transmission. The last transmission time unit of the PDSCH transmission may be determined based on the first repeated transmission time unit of the PDSCH transmission and the number of repeated transmissions. The first transmission time unit of the PDSCH repeated transmission may be determined based on the first transmission time unit of the PDCCH repeated transmission, the number of repeated transmissions, and the timing parameter K0 included in the DCI carried by the PDCCH.

Figure 4:
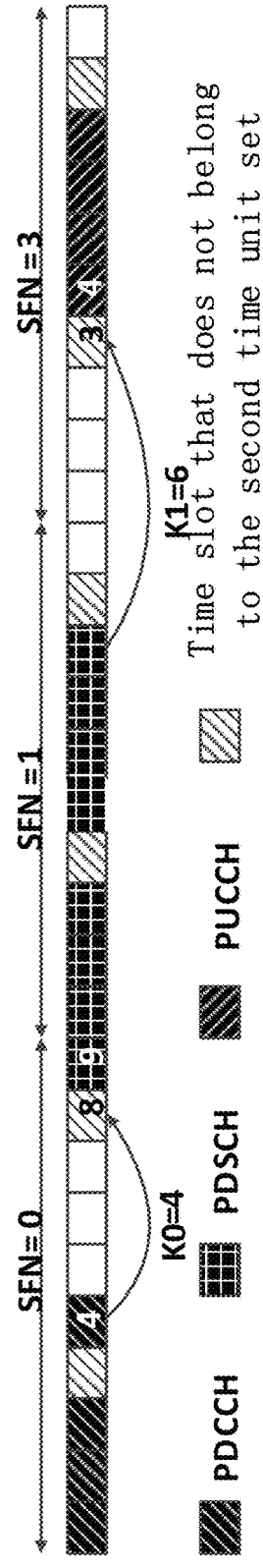
FIG. 4 is a schematic view of determining a first transmission time unit from a plurality of transmission time units corresponding to a PUCCH according to an embodiment of the present disclosure.

Alternatively, the transmission time unit of the PUCCH belongs to the second time unit set. FIG. 4 is a schematic view of determining a first transmission time unit from a plurality of transmission time units corresponding to a PUCCH according to an embodiment of the present disclosure. As shown in FIG. 4, the timing parameter K1=6, a transmission time unit of the PUCCH determined based on a starting time slot of the repeated transmission of the PDSCH, the number of repeated transmissions, and the timing parameter K1 included in the DCI carried by the PDSCH is a time slot 3. However, the time slot 3 does not belong to a third time slot set. In this situation, a first transmission time unit of the PUCCH may be determined to be in a time slot, which is after the time slot 3 and belongs to the second time unit set, i.e., a time slot 4. Alternatively, the timing parameter K1 included in the DCI carried by the PDCCH may be the minimum number of transmission time units between the last transmission time unit of the PDSCH transmission and the first transmission time unit of the PUCCH transmission. The actual number of transmission time units is related to the timing parameter K1 and the second time unit set.

In the art, while implementing the PDSCH transmission in the NR, the base station may carry a Time Domain Resource Allocation (TDRA) domain in a downlink granted DCI. The TDRA domain may indicate a starting position S, a length L, k0 and various types of the PDSCH. The k0 may indicate the number of offset slots between a time slot where the DCI is located and a slot where the PDSCH is located. Table 1 shows resources for transmitting ACK/NACK feedback information indicated by DL grant. The PDSCH-to-HARQ feedback timing indicator indicates the number of slots between the PDSCH and the PUCCH. The PUCCH resource indicator indicates a row in a list of predefined resources, including time-domain resources, frequency-domain resources, and spread spectrum sequence resources of the PUCCH within one slot.

TABLE 1 resources for transmitting ACK/NACK feedback information indicated by DL grant

| | |
|---|---|
| PUCCH resource indicator | 3 bits |
| PDSCH-to-HARQ_feedback timing indicator | 3 bits in DCI format 1_0; 0 bit, 1 bit, 2 bits, and 3 bits in DCI format 1_1, the length configured by the high-layer signaling |

Figure 5:
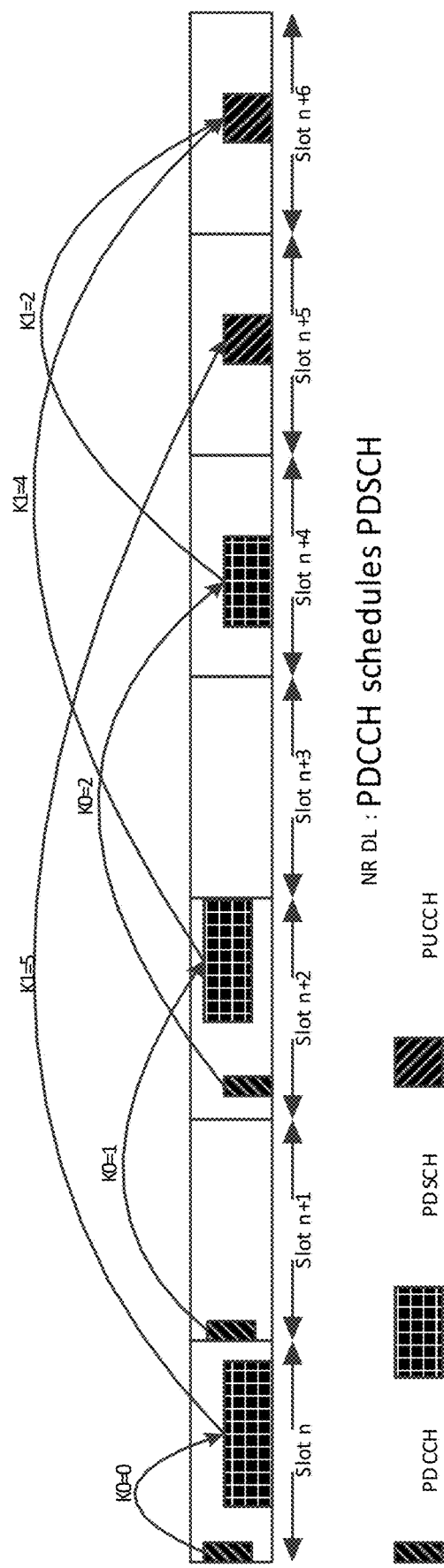
FIG. 5 is a schematic view of a PDCCH scheduling a PDSCH in the art.

FIG. 5 is a schematic view of a PDCCH scheduling a PDSCH in the art. As shown in FIG. 5, the PDCCH schedules the PDSCH. When K0 is 0, 1 and 2, and K1 is 5, 4 and 2, the PDSCH may be scheduled by the PDCCH.

Figure 6:
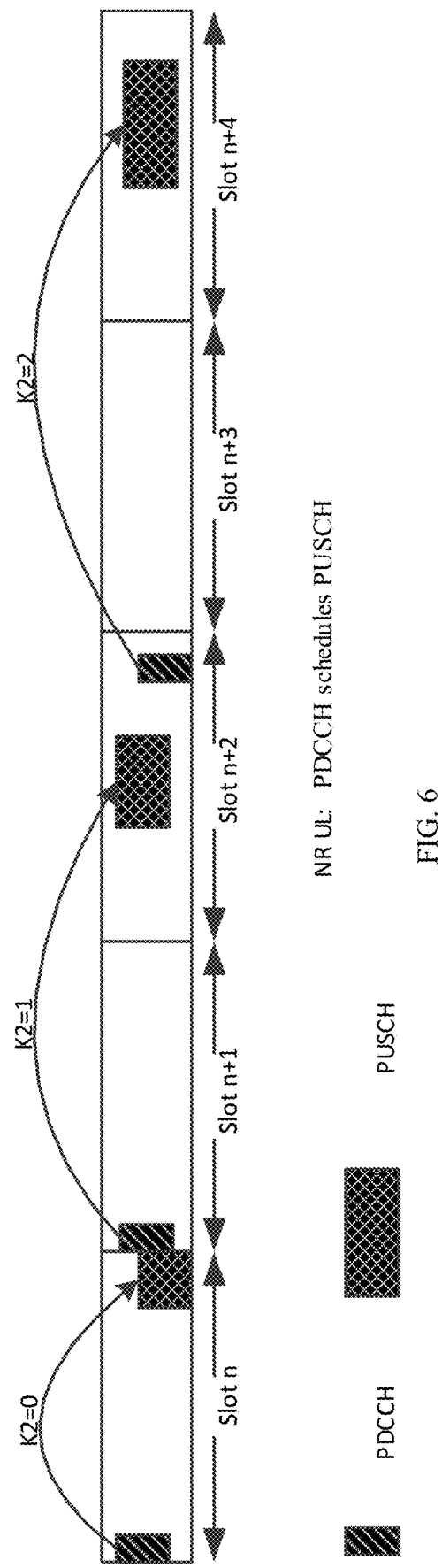
FIG. 6 is a schematic view of a PDCCH scheduling a PUSCH in the art.

In the art, when implementing the PUSCH transmission in the NR, the base station sends an uplink grant (UL grant) to schedule the PUSCH transmission. When the base station schedules uplink data transmission via the DCI of the UL grant, a TDRA domain may be carried in the DCI. The TDRA domain may be 4 bits and may indicate 16 different rows in a resource allocation table. For example, the starting position S of the PDSCH, the length L, k2, various types, and so on. The k2 indicates the number of offset slots between the slot where the DCI is located and the slot where the PUSCH is located. FIG. 6 is a schematic view of a PDCCH scheduling a PUSCH in the art. As shown in FIG. 6, when the k2 is 0, 1 and 2, the PUSCH can be scheduled by the PDCCH.

Figure 7:
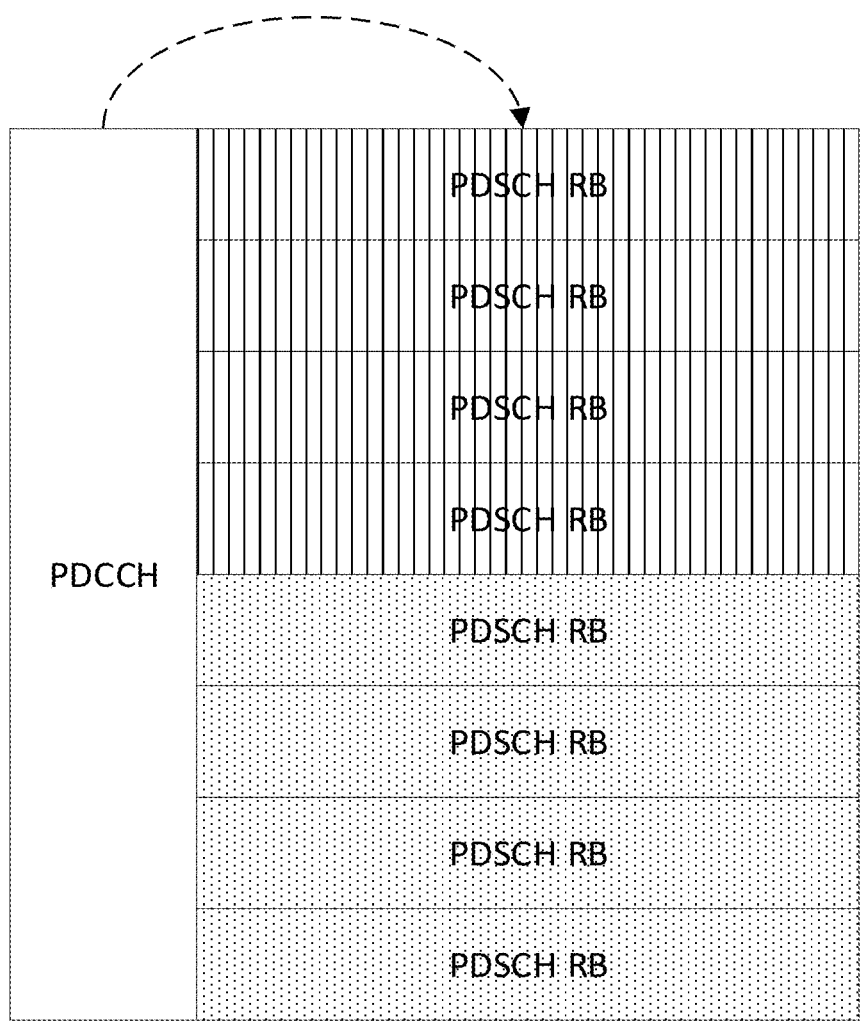
FIG. 7 is a schematic diagram of a PDCCH scheduling a PDSCH in the art.
Figure 8:
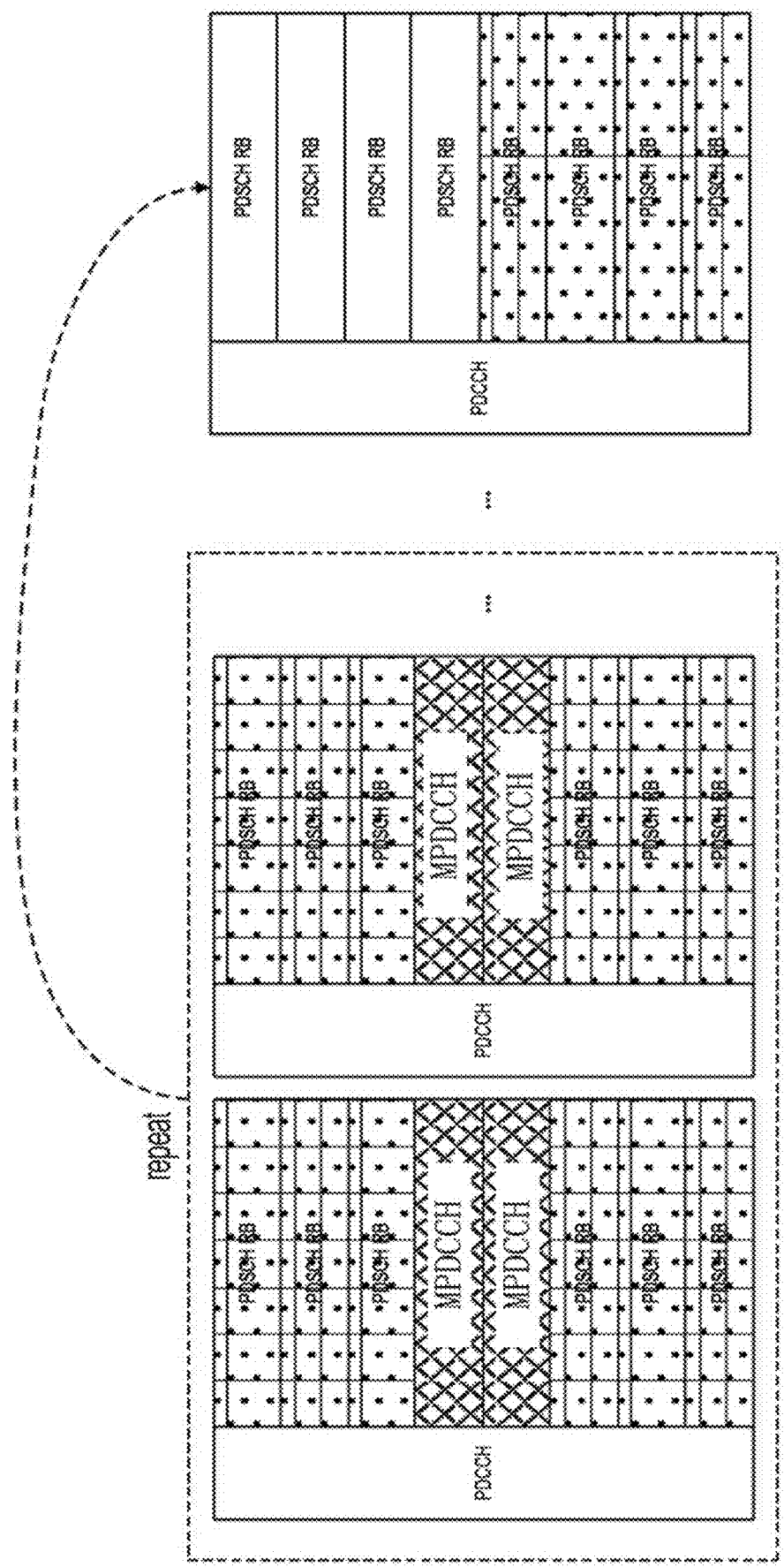
FIG. 8 is a schematic view of an MPDCCH supporting repetition in a plurality of subframes according to an embodiment of the present disclosure.

In the art, for the MPDCCH in MTC system, the MPDCCH may be introduced into the LTE MTC system. Frequency hopping and repetition may be introduced into the MPDCCH transmission. Resources occupied by the MPDCCH and the PDSCH may be frequency division multiplexed. As shown in FIG. 7, FIG. 7 is a schematic diagram of a PDCCH scheduling a PDSCH in the art. For the PDSCH scheduled by the MPDCCH, the MPDCCH may be in a narrow band that is frequency-divided from the PDSCH, the MPDCCH may support repetition in various subframes. MPDCCH in various subframes may perform frequency hopping. The MPDCCH and the PDSCH scheduled by the MPDCCH may not be in a same narrow band. The DCI carried in the MPDCCH may indicate the narrow band where the PDSCH is located. FIG. 8 is a schematic view of an MPDCCH supporting repetition in a plurality of subframes according to an embodiment of the present disclosure. As shown in FIG. 8, the MPDCCH of downlink physical channels of the various subframes may perform frequency hopping. The MPDCCH and the PDSCH scheduled by the MPDCCH may not be in a same frequency-domain sub-band. In the MTC system, both the MPDCCH and PDSCH scheduled by the MPDCCH may perform repeated transmission. The repeated transmission of the MPDCCH may be performed in the number of repetitions of downlink subframes. Consecutively transmitting PDSCH of n BL/CE downlink subframes may be started from the $2^{nd}$ Bandwidth reduced Low complexity/Coverage Enhancement (BL/CE, which is a UE type introduced into the MTC system) downlink subframe after the last subframe of the MPDCCH transmission.

Figure 9:
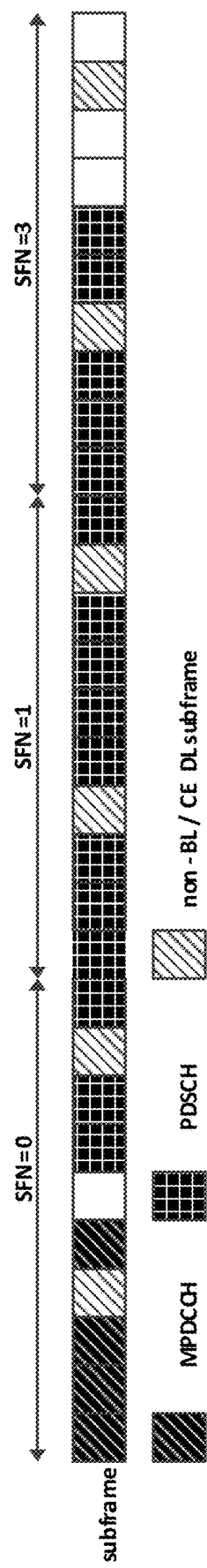
FIG. 9 is a schematic view of PDSCH transmission in an MTC system in the art.

FIG. 9 is a schematic view of PDSCH transmission in an MTC system in the art. As shown in FIG. 9, the number of repetitions of MPDDCH may be 4, the number of repetitions of PDSCH may be 16, and the PDSCH starts at the 2nd BL/CE downlink subframe after the last subframe of the MPDCCH transmission.

In the art, when channel repeated transmission is introduced into the NR-light system, timing relationships between the PDCCH, the PDSCH and the PUSCH need to be reconsidered. However, the timing relationships defined in the NR system in the art are not applicable to the scenario of channel repeated transmission. In the present embodiment, the terminal receives the DCI and determines the timing parameter in the DCI. In the present disclosure, a channel retransmission mechanism is applied, a meaning of the timing parameter indicated in the DCI is determined, such as the time interval between the last transmission time unit of the PDCCH and the first transmission time unit of the PDSCH/PUSCH. Determining the time interval between the last transmission time unit of the PDCCH and the first transmission time unit of the PUCCH allows the terminal to correctly determine the transmission timing of the corresponding channel. In this way, the technical problem that when repeated transmission is performed in channels, the transmission time units of channels cannot be determined accurately, may be solved.

Figure 10:
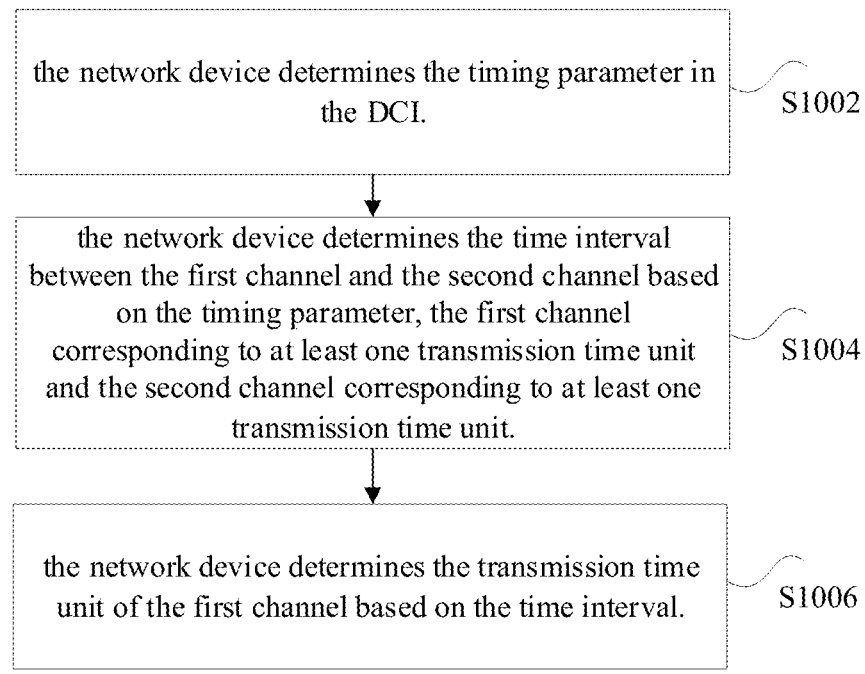
FIG. 10 is a flow chart of another channel processing method according to an embodiment of the present disclosure.

The channel processing method of the present embodiment will be further described below from the network side. To be noted that the channel processing method on the network side corresponds to the method on the terminal side described above. FIG. 10 is a flow chart of another channel processing method according to an embodiment of the present disclosure. As shown in FIG. 10, the method may include the following operations. In an operation S1002, the network device determines the timing parameter in the DCI. The network device may transmit the DCI to the terminal or may determine the timing parameter in the DCI. In an operation S1004, the network device determines the time interval between the first channel and the second channel based on the timing parameter. The first channel corresponds to at least one transmission time unit, and the second channel corresponds to at least one transmission time unit. Technical solutions provided in the present operation may be the same as the method performed by the terminal in the operation S104 of the present disclosure. In an operation S1006, the network device determines the transmission time unit of the first channel based on the time interval. Technical solutions provided in the present operation may be the same as the method performed by the terminal in the operation S106 of the present disclosure.

In an implementation, the operation of the network device determining the time interval between the first channel and the second channel based on the timing parameter may include following operations. The network device may determine the time interval between at least one first transmission time unit of the at least one transmission time unit corresponding to the first channel and at least one second transmission time unit of the at least one transmission time unit corresponding to the second channel based on the timing parameter. The method further includes following operations. The network device determines the at least one transmission time unit corresponding to the second channel based on transmission information of the second channel.

In an implementation, the operation of the network device determining the transmission time unit of the first channel based on the time interval may include following operations. The network device determines the transmission time unit of the first channel based on the time interval and the transmission information of the second channel. The transmission information of the second channel may include: the first number of the at least one transmission time unit corresponding to the second channel, and a first transmission time unit of the at least one transmission time unit corresponding to the second channel. The operation of the network device determining the transmission time unit of the first channel based on the time interval and the transmission information of the second channel may include following operations. The network device may determine at least one second transmission time unit based on the first number and the first transmission time unit of the at least one transmission time unit corresponding to the second channel. The network device may determine at least one transmission time unit in the at least one first transmission time unit based on the time interval and at least one transmission time unit in the at least one second transmission time unit. The network device may determine the at least one transmission time unit in the at least one first transmission unit to be a transmission time unit of the first channel. The operation of the network device determining at least one transmission time unit in the at least one first transmission time unit based on the time interval and the at least one transmission time unit in the at least one second transmission time unit may include following operations. The network device may determine whether the transmission time unit belongs to a time unit set, and the transmission time unit may be obtained based on the time interval and the at least one transmission time unit in the at least one second transmission time unit. In response to the obtained transmission time unit belonging to the time unit set, the network device may determine the obtained transmission time unit to be at least one of the at least one first transmission time unit. In response to the obtained transmission time unit not belonging to the time unit set, the network device may determine a transmission time unit after the obtained transmission time unit, which belongs to the time unit set, to be the at least one of the at least one first transmission time unit.

In an implementation, when the first channel is the PDSCH, and the second channel is the PDCCH, the time unit set may be a first time unit set. The first time unit set may be a set of available downlink time units. When the first channel is the PUSCH and the second channel is the PDCCH, or when the first channel is the PUCCH and the second channel is the PDSCH, the time unit set may be a second time unit set. The second time unit set may be a set of available uplink time units. The method may further include following operations. When the first channel is the PDSCH and the second channel is the PDCCH, or when the first channel is the PUSCH and the second channel is the PDCCH, the network device may obtain the first transmission time unit of the at least one transmission time unit corresponding to the PDCCH through the high-layer signaling and/or the DCI. When the first channel is the PUCCH and the second channel is the PDSCH, the network device may determine the first transmission time unit of the at least one transmission time unit corresponding to the PDSCH, based on the transmission information of the PDCCH and the time interval between the last transmission time unit in the at least one transmission time unit corresponding to the PDCCH and the first transmission time unit in the at least one transmission time unit corresponding to the PDSCH.

In an implementation, the network device may obtain the first number through the high-layer signaling and/or the DCI. In an implementation, the DCI carried by the PDCCH may include the timing parameter. The second number of transmission time units may be present between at least one of the at least one first transmission time unit and at least one of the at least one second transmission time unit. Timing parameters in DCIs carried by the PDCCH in at least two transmission time units may be identical, and the timing parameter may be the second number. Alternatively, timing parameters in DCIs carried by the PDCCH in at least two transmission time units may be different, and the second number may be determined based on at least one of the different timing parameters.

In an implementation, the operation of the network device determining the time interval between the first channel and the second channel based on the timing parameter may include following operations. The network device may determine time corresponding to the second number to be as the time interval. The second number may be the minimum number of transmission time units between the at least one of the at least one first transmission time unit and the at least one of the at least one second transmission unit.

In an implementation, the at least one first transmission time unit is the first transmission time unit of the at least one transmission time unit corresponding to the first channel. The at least one second transmission unit is the last transmission unit of the at least one transmission time unit corresponding to the second channel. In an embodiment, the first channel may be the PDSCH and the second channel may be the PDCCH; or the first channel may be the PUSCH and the second channel may be the PDCCH; or the first channel may be the PUCCH and the second channel may be the PDSCH.

According to the above description, any ordinary skilled person in the art shall understand that the method according to the above embodiments can be implemented by means of software and necessary common hardware platforms or hardware. In many cases, the software and the necessary common hardware platform may be a better implementation.

Figure 11:
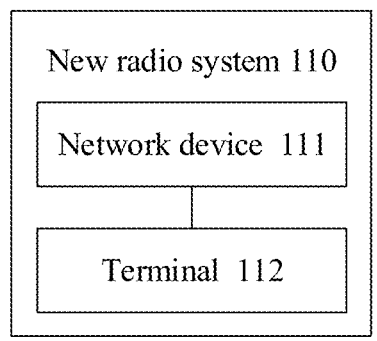
FIG. 11 is a schematic view of a new radio system according to an embodiment of the present disclosure.

Embodiments of the present disclosure further provide a NR system. The NR system may be configured to perform the channel processing method shown in FIG. 1 or FIG. 10, which have been described and will not be repeated herein. FIG. 11 is a schematic view of a new radio system according to an embodiment of the present disclosure. As shown in FIG. 11, the NR system 110 may include: a network device 111 and a terminal 112. The network device 111 may be configured to send the DCI, and the DCI may carry the timing parameter. The terminal 112 may be configured to receive the DCI, determine the timing parameter in the DCI, and determine the time interval between the first channel and the second channel based on the timing parameter. The first channel may correspond to at least one transmission time unit, and the second channel may correspond to at least one transmission time unit. The terminal 112 may further be configured to determine the transmission time unit of the first channel based on the time interval.

Figure 12:
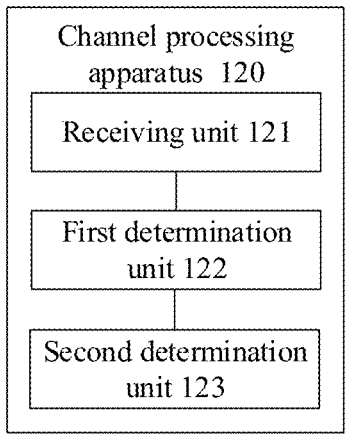
FIG. 12 is a schematic view of a channel processing apparatus according to an embodiment of the present disclosure.

Embodiments of the present disclosure further provide a control channel determination apparatus. The control channel determination apparatus may be configured to perform the channel processing method shown in FIG. 1 or FIG. 2, which have been described and will not be repeated herein. FIG. 12 is a schematic view of a channel processing apparatus according to an embodiment of the present disclosure. As shown in FIG. 12, the channel processing apparatus 120 may include: a receiving unit 121, a first determination unit 122 and a second determination unit 123. In the present embodiment, the channel processing apparatus 120 may be configured in a terminal and may include: the receiving unit 121, configured to receive the DCI and determine the timing parameter in the DCI; the first determination unit 122, configured to determine the time interval between the first channel and the second channel based on the timing parameter; and the second determination unit 123, configured to determine the transmission time unit of the first channel based on the time interval. The first channel may correspond to at least one transmission time unit, and the second channel may correspond to at least one transmission time unit.

Alternatively, the first determination unit may include: a first determination module, configured to determine the time interval between the at least one first transmission time unit of the at least one transmission time unit corresponding to the first channel and the at least one second transmission time unit of the at least one transmission time unit corresponding to the second channel based on the timing parameter. The apparatus may further include: a third determination unit, configured to determine the at least one transmission time unit corresponding to the second channel based on the transmission information of the second channel. The second determination unit may include: a second determination module, configured to determine the transmission time unit of the first channel based on the time interval and the transmission information of the second channel. The transmission information of the second channel may include: the first number of the at least one transmission time unit corresponding to the second channel, and the first transmission time unit of the at least one transmission time unit corresponding to the second channel. The second determination module may include: a first determination sub-module, configured to determine at least one second transmission time unit based on the first number and the first transmission time unit of the at least one transmission time unit corresponding to the second channel; and a second determination sub-module, configured to determine the at least one transmission time unit in the at least one first transmission time unit based on the time interval and the at least one transmission time unit in the at least one second transmission time unit; and a third determination sub-module, configured to determine the at least one transmission time unit in the at least one first transmission unit to be the transmission time unit of the first channel.

Alternatively, the second determination sub-module may be configured to perform the following operations to determine the at least one of the at least one first transmission time unit based on the time interval and the at least one of the at least one second transmission time unit. The terminal may determine whether the transmission time unit, which is obtained based on the time interval and the at least one of the at least one second transmission time unit, belongs to the time unit set. In response to the obtained transmission time unit belonging to the time unit set, the terminal may determine the obtained transmission time unit to be the at least one of the at least one first transmission time unit. In response to the obtained transmission time unit not belonging to the time unit set, the terminal may determine the transmission time unit after the obtained transmission time unit, which belongs to the time unit set, to be the at least one transmission time unit in the at least one first transmission time unit.

Alternatively, when the first channel is the PDSCH and the second channel is the PDCCH, the time unit set may be the first time unit set, and the first time unit set may be the set of available downlink time units. When the first channel is the PUSCH and the second channel is the PDCCH, or when the first channel is the PUCCH and the second channel is the PDSCH, the time unit set may be the second time unit set, and the second time unit set may be the set of available uplink time units.

Alternatively, the apparatus may further include: a first obtaining unit, configured to obtain the first transmission time unit of the at least one transmission time unit corresponding to the PDCCH through the high-layer signaling and/or the DCI, when first channel is the PDSCH and the second channel is the PDCCH, or when the first channel is the PUSCH and the second channel is the PDCCH. The apparatus may further include a fourth determination unit, configured to determine the first transmission time unit of the at least one transmission time unit corresponding to the PDSCH based on the transmission information of the PDCCH and the time interval between the last transmission time unit in the at least one transmission time unit corresponding to the PDCCH and the first transmission time unit in the at least one transmission time unit corresponding to the PDSCH, when the first channel is the PUCCH and the second channel is the PDSCH.

Alternatively, the device may further include: a second obtaining unit, configured to obtain the first number through the high-layer signaling and/or the DCI.

Alternatively, the DCI carried by the PDCCH may include the timing parameter. The second number of transmission time units may be present between the at least one of the at least one first transmission time unit and the at least one of the at least one second transmission time unit. Timing parameters in DCIs carried by the PDCCH in at least two transmission time units may be identical, and the timing parameter may be the second number. Alternatively, timing parameters in DCIs carried by the PDCCH in at least two transmission time units may be different, and the second number may be determined based on at least one of the different timing parameters. The first determination unit may include: a third determination module, configured to determine the time corresponding to the second number to be the time interval. The second number may be the minimum number of transmission time units between the at least one of the at least one first transmission time unit and the at least one of the at least one second transmission unit.

Alternatively, the at least one first transmission time unit may be the first transmission time unit of the at least one transmission time unit corresponding to the first channel, and the at least one second transmission unit may be the last transmission unit of the at least one transmission time unit corresponding to the second channel. Alternatively, the first channel may be the PDSCH, and the second channel may be the PDCCH; or the first channel may be the PUSCH, and the second channel may be the PDCCH; or the first channel may be the PUCCH, and the second channel may be the PDSCH.

Figure 13:
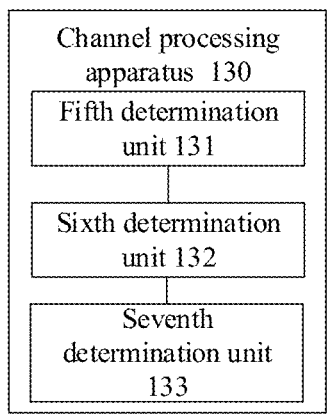
FIG. 13 is a schematic view of another channel processing device according to an embodiment of the present disclosure.

FIG. 13 is a schematic view of another channel processing device according to an embodiment of the present disclosure. As shown in FIG. 13, the channel processing apparatus 130 may include: a fifth determination unit 131, a sixth determination unit 132 and a seventh determination unit 133. The channel processing apparatus 130 may be configured in the network device and may include: a fifth determination unit 131, configured to determine the timing parameter in the DCI; a sixth determination unit 132, configured to determine the time interval between the first channel and the second channel based on the timing parameter; and a seventh determination unit 133, configured to determine the transmission time unit of the first channel based on the time interval. The first channel may correspond to at least one transmission time unit, and the second channel may correspond to at least one transmission time unit.

Alternatively, the sixth determination unit may include: a fourth determination module, configured to determine determining the time interval between the at least one first transmission time unit of the at least one transmission time unit corresponding to the first channel and the at least one second transmission time unit of the at least one transmission time unit corresponding to the second channel, based on the timing parameter. The apparatus may further include: an eighth determination unit, configured to determine the at least one transmission time unit corresponding to the second channel based on the transmission information of the second channel. The seventh determination unit may include: a fifth determination module, configured to determine the transmission time unit of the first channel based on the time interval and the transmission information of the second channel. The transmission information of the second channel may include: the first number of the at least one transmission time unit corresponding to the second channel, and the first transmission time unit of the at least one transmission time unit corresponding to the second channel. The fifth determination module may include: a fourth determination sub-module, configured to determine the at least one second transmission time unit based on the first number and the first transmission time unit of the at least one transmission time unit corresponding to the second channel; a fifth determination sub-module, configured to determine the at least one transmission time unit in the at least one first transmission time unit based on the time interval and the at least one transmission time unit in the at least one second transmission time unit; and a sixth determination sub-module, configured to determine the at least one transmission time unit in the at least one first transmission unit to be the transmission time unit of the first channel.

Alternatively, the operation of the fifth determination sub-module determining the at least one of the at least one first transmission time unit based on the time interval and the at least one of the at least one second transmission time unit, may include following operations. The network device may determine whether the transmission time unit, which is obtained based on the time interval and the at least one of the at least one second transmission time unit, belongs to the time unit set. In response to the obtained transmission time unit belonging to the time unit set, the network device may determine the obtained transmission time unit to be the at least one transmission time unit in the at least one first transmission time unit. In response to the obtained transmission time unit not belonging to the time unit set, the network device may determine a transmission time unit after the obtained transmission time unit, which belongs to the time unit set, to be the at least one transmission time unit in the at least one first transmission time unit.

Alternatively, when the first channel is the PDSCH and the second channel is the PDCCH, the time unit set may be the first time unit set, and the first time unit set may be the set of available downlink time units. When the first channel is the PUSCH and the second channel is the PDCCH, or when the first channel is the PUCCH and the second channel is the PDSCH, the time unit set may be the second time unit set, and the second time unit set may be the set of available uplink time units. Alternatively, the apparatus may further include: a third obtaining unit, configured to obtain the first transmission time unit of the at least one transmission time unit corresponding to the PDCCH through the higher-layer signaling and/or the DCI, when the first channel is the PDSCH and the second channel is the PDCCH, or when the first channel is the PUSCH and the second channel is the PDCCH. The apparatus may further include: a ninth determination unit, configured to determine the first transmission time unit of the at least one transmission time unit corresponding to the PDSCH, based on the transmission information of the PDCCH and the time interval between the last transmission time unit of the at least one transmission time unit corresponding to the PDCCH and the first transmission time unit of the at least one transmission time unit corresponding to the PDSCH, when the first channel is the PUCCH and the second channel is the PDSCH.

Alternatively, the apparatus may further include: a fourth obtaining unit, configured to obtain the first number through the high-layer signaling and/or the DCI. Alternatively, the DCI carried by the PDCCH may include the timing parameter. The second number of transmission time units may be present between the at least one of the at least one first transmission time unit and the at least one of the at least one second transmission time unit. Timing parameters in DCIs carried by the PDCCH in at least two transmission time units may be identical, and the timing parameter may be the second number. Alternatively, timing parameters in DCIs carried by the PDCCH in at least two transmission time units may be different, and the second number may be determined based on at least one of the different timing parameters. The sixth determination unit may include: a sixth determination module, configured to determine the time corresponding to the second number to be the time interval. The second number may be the minimum number of transmission time units between the at least one of the at least one first transmission time unit and the at least one of the at least one second transmission unit.

Alternatively, the at least one first transmission time unit may be the first transmission time unit of the at least one transmission time unit corresponding to the first channel, and the at least one second transmission unit may be the last transmission unit of the at least one transmission time unit corresponding to the second channel. Alternatively, the first channel may be the PDSCH, and the second channel may be the PDCCH; or the first channel may be the PUSCH, and the second channel may be the PDCCH; or the first channel may be the PUCCH, and the second channel may be the PDSCH.

Figure 14:
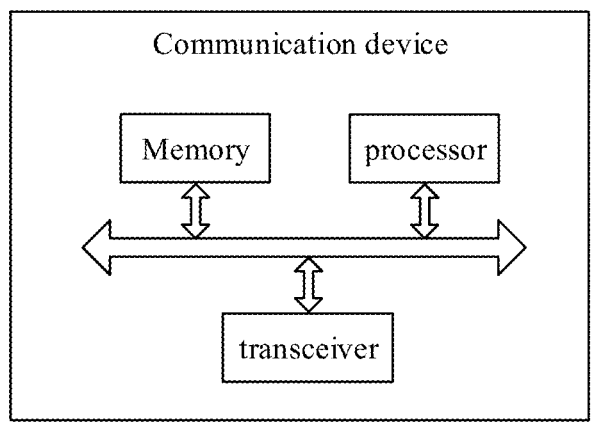
FIG. 14 is a schematic structural view of a communication device according to an embodiment of the present disclosure.

FIG. 14 is a schematic structural view of a communication device according to an embodiment of the present disclosure. As shown in FIG. 14, the communication device may include a processor. The processor may invoke and run a computer program from a memory to implement the method in embodiments of the present disclosure. Alternatively, as shown in FIG. 14, the communication device may further include the memory. The processor may invoke and run the computer program from the memory to implement the method in embodiments of the present disclosure. The memory may be a device separated from the processor or may be integrated into the processor. Alternatively, as shown in FIG. 14, the communication device may further include a transceiver. The processor may control the transceiver to communicate with other devices. Specifically, the processor may control the transceiver to send information or data to other devices, or to receive information or data from other devices. The transceiver may include a transmitter and a receiver. The transceiver may further include an antenna, and the number of antennas may be one or more. Alternatively, the communication device may specifically be a network device of the embodiment of the present disclosure, and the communication device may implement the corresponding operations implemented by the network device in the methods of various embodiment of the present disclosure, which will not be repeatedly described herein. Alternatively, the communication device may specifically be a mobile terminal/a terminal device of the embodiment of the present disclosure. The communication device may implement the corresponding operations implemented by the mobile terminal/the terminal device in the methods of various embodiment of the present disclosure, which will not be repeatedly described herein.

Figure 15:
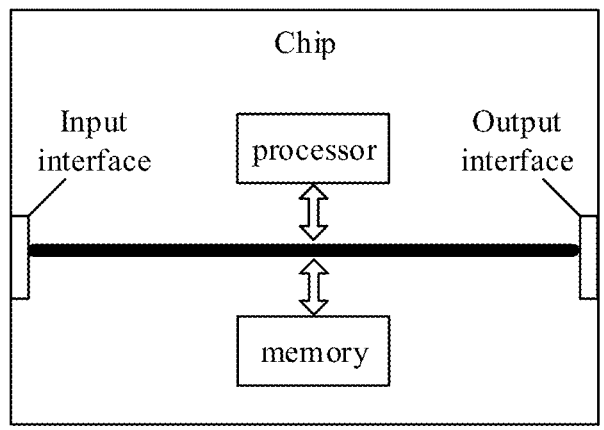
FIG. 15 is a schematic view of a chip according to an embodiment of the present disclosure.

FIG. 15 is a schematic view of a chip according to an embodiment of the present disclosure. As shown in FIG. 15, the chip may include a processor. The processor may invoke and run a computer program from a memory to implement the methods in the embodiments of the present disclosure. Alternatively, as shown in FIG. 15, the chip may further include the memory. The processor may invoke and run the computer program from the memory to implement the methods in the embodiments of the present disclosure. The memory may be a device separated from the processor or may be integrated in the processor. Alternatively, the chip may further include an input interface. The processor may control the input interface to communicate with other devices or chips. In detail, the processor may control the input interface to obtain information or data sent by other devices or chips. The chip may further include an output interface. The processor may control the output interface to communicate with other devices or chips. In detail, the processor may control the output interface to output information or data to other devices or chips. Alternatively, the chip may be applied to the network device in the embodiments of the present disclosure. The chip may perform the corresponding operations implemented by the network device in the methods of the various embodiment of the present disclosure, which will not be repeatedly described herein. Alternatively, the chip may be applied to the mobile terminal/the terminal device in the embodiments of the present disclosure. The chip may perform the corresponding operations implemented by the mobile terminal/the terminal device in the methods of the various embodiment of the present disclosure, which will not be repeatedly described herein. The chip described in embodiments of the present disclosure may also be referred to as a system-level chip, a systemic chip, a system-on-a-chip, and so on.

Figure 16:
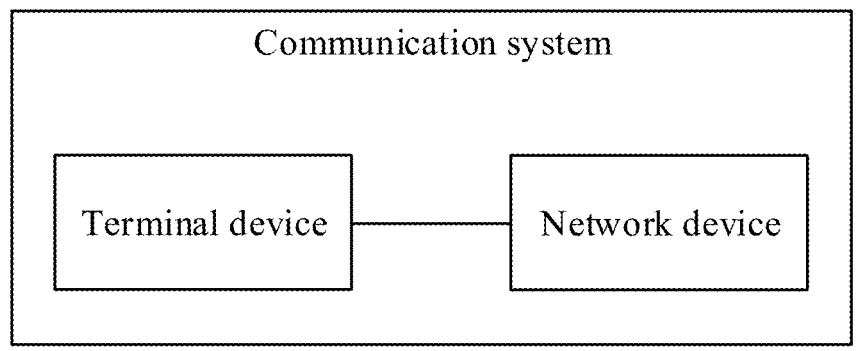
FIG. 16 is a structural block diagram of a communication system according to an embodiment of the present disclosure.

FIG. 16 is a structural block diagram of a communication system according to an embodiment of the present disclosure. As shown in FIG. 16, the communication system may include a terminal device and a network device. The terminal device may be configured to implement the corresponding functions implemented by the terminal device in the methods described above. Further, the network device may be configured to implement the corresponding functions implemented by the network device in the methods described above. Functions will not be repeatedly described hereinafter. It shall be understood that the processor of the present disclosure may be an integrated circuit chip having signal processing capabilities. In implementations, the operations of the above method embodiments may be accomplished by an integrated logic circuit in the hardware in the processor or by instructions in the form of software. The processor as described above may be a general purpose processor, a Digital Signal Processor (DSP), an Application Specific Integrated Circuit (ASIC), a Field Programmable Gate Array (FPGA) or other programmable logic devices, discrete gate or transistor logic devices, discrete hardware components. The processor may implement or perform various methods, operations and logical block diagrams in embodiments of the present disclosure. The general purpose processor may be a microprocessor or any conventional processor, and so on. The operations of the methods disclosed in embodiments of the present disclosure may be performed by a hardware decoding processor or by a combination of hardware and software modules in the decoding processor. The software module may be located in a random memory, a flash memory, a read-only memory, a programmable read-only memory or an electrically erasable programmable memory, registers and other storage media that are well established in the art. The storage medium is located in the memory, and the processor reads information in the memory and completes the operations of the above methods through the hardware.

It shall be understood that the memory in embodiments of the present disclosure may be a volatile memory or a non-volatile memory, or may include both the volatile and the non-volatile memory. The non-volatile memory may be a Read-Only Memory (ROM), a Programmable ROM (PROM), an Erasable Programmable Read-Only Memory (EPROM), an Electrically Erasable Programmable Read-Only Memory (EPROM), or a flash memory. The volatile memory may be a Random Access Memory (RAM), configured as an external cache. To be exemplary, but not for limiting, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Memory Bus Random Access Memory (DR RAM). To be noted that, the memories of the systems and methods described herein are intended to include, but are not limited to, the above and any other suitable types of memories. It shall be understood that the above memories are exemplary but are not limiting descriptions. For example, the memories in embodiments of the present disclosure may also be a static RAM (SRAM), a dynamic RAM (DRAM), a synchronous DRAM (SDRAM), a double data rate SDRAM (DDR SDRAM), an enhanced synchronous SDRAM (ESDRAM), a synchronous link DRAM (SDR SDRAM), and a Direct Rambus RAM (DR RAM), and so on. That is, the memories in embodiments of the present disclosure are intended to include, but are not limited to, the above and any other suitable types of memories.

Embodiments of the present disclosure further provide a computer readable storage medium for storing a computer program. Alternatively, the computer readable storage medium may be applied to the network device in the embodiments of the present disclosure, and the computer program causes the computer to perform the corresponding operations implemented by the network device in the various methods of the embodiments of the present disclosure, which will not be described herein. Alternatively, the computer readable storage medium may be configured in the mobile terminal/the terminal device in the embodiments of the present disclosure, and the computer program causes the computer to perform the corresponding operations implemented by the mobile terminal/the terminal device in the methods of the embodiments of the present disclosure, which will not be repeated herein. Embodiments of the present disclosure further provide a computer program product including computer program instructions. Alternatively, the computer program product may be applied to the network device in the embodiments of the present disclosure, and the computer program instructions cause the computer to perform the corresponding operations implemented by the network device in the methods of the embodiments of the present disclosure, which will not be described herein for brevity. Alternatively, the computer program product may be applied to the mobile terminal/the terminal device in the embodiments of the present disclosure, and the computer program instructions cause the computer to perform the corresponding operations implemented by the mobile terminal/the terminal device in the methods of the embodiment of the present disclosure, which will not be repeated herein. Embodiments of the present disclosure further provide a computer program. Alternatively, the computer program may be applied to the network device in the embodiments of the present disclosure. When the computer program is run on a computer, the computer program causes the computer to perform the corresponding operations implemented by the network device in the methods of the embodiments of the present disclosure, which will not be described herein. Alternatively, the computer program may be applied to the mobile terminal/the terminal device in the embodiments of the present disclosure. When the computer program is run on the computer, the computer program causes the computer to perform the corresponding operations implemented by the mobile terminal/the terminal device in the methods of the embodiments of the present disclosure, which will not be repeated herein.

Any ordinary skilled person in the art shall understand that the units and algorithmic operations of the various examples described in the embodiments of the present disclosure are capable of being implemented in electronic hardware, or a combination of computer software and electronic hardware. These functions being performed in hardware or software may be determined based on particular applications and design constraints of technical solutions. The skilled person may perform different methods to implement described functions for each particular application, but the implementations shall not be considered as falling out of the scope of the present disclosure. It will be clear to the skilled person in the art that, the specific working processes of the systems, the devices and the units described above may be referred to the corresponding processes in the method embodiments and will not be repeated here. In the various embodiments provided by the present disclosure, it shall be understood that the systems, the devices and the methods disclosed herein may be implemented in other ways. For example, the apparatus in the embodiments described above are merely exemplary. For example, division of the units is only logical functional division, and the units can be divided in another way when actually implemented. For example, a plurality of units or components can be combined or can be integrated into another system, or some features can be omitted or not implemented. On another point, mutual coupling or direct coupling or communicative connection shown or discussed may be indirect coupling or indirect communicative connection through some interfaces, devices or units, which may be electrical, mechanical and the like. The units illustrated as separates components may or may not be physically separated, and components displayed as units may or may not be physical units. That is, the components may be located in one place or may be distributed over a plurality of network units. Some or all of these units can be selected based on practical needs to achieve purposes of the present disclosure. Alternatively, individual functional units in the various embodiments of the present disclosure may be integrated in a single processing unit, or may be physically present separately. Alternatively, two or more units may be integrated in a single unit. The functions described may be stored in a computer readable storage medium when the functions are implemented in a form of a software functional unit and sold or used as a separate product. Therefore, essence of the technical solution of the present invention, or a part of the technical solution that contributes to the art, may be embodied in the form of the software product. The software product may be stored in a storage medium and may include a number of instructions to enable a computer device (which may be a personal computer, a server, or a network device, and so on) to perform all or some of the operations of the methods in the various embodiments of the present disclosure. The aforementioned storage medium includes a USB stick, a removable hard disk, a Read-Only Memory (ROM), a Random Access Memory (RAM), a magnetic disk, a CD-ROM, and other media that can store program codes.

The above description shows only embodiments of the present disclosure, but does not limit the scope of the present disclosure. Any variation or substitution performed by any skilled person in the art within the scope of the technology disclosed herein shall be covered by the scope of the present disclosure. The scope of the present disclosure shall therefore be governed by the claims.

What is claimed is:

1. A channel processing method, comprising:
receiving, by a terminal, downlink control information (DCI) and determining a timing parameter in the DCI;
determining, by the terminal, a time interval between a first channel and a second channel based on the timing parameter, the first channel corresponding to at least one transmission time unit and the second channel corresponding to at least one transmission time unit; and
determining, by the terminal, a transmission time unit of the first channel based on the time interval;
wherein the determining a time interval between a first channel and a second channel based on the timing parameter, comprises:
determining, by the terminal, a time interval between at least one first transmission time unit of the at least one transmission time unit corresponding to the first channel and at least one second transmission time unit of the at least one transmission time unit corresponding to the second channel based on the timing parameter;
wherein the at least one first transmission time unit is the first transmission time unit of the at least one transmission time unit corresponding to the first channel, and the at least one second transmission time unit is the last transmission time unit of the at least one transmission time unit corresponding to the second channel.

2. The channel processing method according to claim 1, further comprising:
determining, by the terminal, the at least one transmission time unit corresponding to the second channel based on transmission information of the second channel.

3. The channel processing method according to claim 2, wherein the determining a transmission time unit of the first channel based on the time interval, comprises:
determining, by the terminal, the transmission time unit of the first channel based on the time interval and the transmission information of the second channel.

4. The channel processing method according to claim 3, wherein the transmission information of the second channel comprises:
the first number of the at least one transmission time unit corresponding to the second channel; and
the first transmission time unit in the at least one transmission time unit corresponding to the second channel; and
the determining the transmission time unit of the first channel based on the time interval and the transmission information of the second channel, comprises:
determining, by the terminal, the at least one second transmission time unit based on the first number and the first transmission time unit in the at least one transmission time unit corresponding to the second channel;

determining, by the terminal, at least one of the at least one first transmission time unit based on the time interval and at least one of the at least one second transmission time unit; and determining, by the terminal, the at least one of the at least one first transmission time unit to be the transmission time unit of the first channel.

5. The channel processing method according to claim 4, wherein the determining at least one of the at least one first transmission time unit based on the time interval and at least one of the at least one second transmission time unit, comprises:

determining, by the terminal, whether a determined transmission time unit based on the time interval and the at least one of the at least one second transmission time unit belongs to a time unit set;

determining, by the terminal, the determined transmission time unit to be the at least one of the at least one first transmission time unit, in response to the determined transmission time unit belonging to the time unit set; and determining, by the terminal, a transmission time unit after the determined transmission time unit, which belongs to the time unit set, to be the at least one of the at least one first transmission time unit, in response to the determined transmission time unit not belonging to the time unit set.

6. The channel processing method according to claim 5, wherein the time unit set is a first time unit set, and the first time unit set is a set of available downlink time units, in response to the first channel being a physical downlink shared channel (PDSCH) and the second channel being a physical downlink control channel (PDCCH); and/or the time unit set is a second time unit set, and the second time unit set is a set of available uplink time units, in response to the first channel being a physical uplink shared channel (PUSCH) and the second channel being a PDCCH, or the first channel being a physical uplink control channel (PUCCH) and the second channel is a PDSCH.

7. The channel processing method according to claim 1, wherein DCI carried by a PDCCH comprises the timing parameter;

the second number of transmission time units are present between at least one of the at least one first transmission time unit and at least one of the at least one second transmission time unit;

wherein timing parameters in DCIs carried by the PDCCH in at least two transmission time units are identical, and the timing parameter is the second number; or timing parameters in DCIs carried by the PDCCH in at least two transmission time units are different, and the second number is determined based on at least one of the different timing parameters.

8. The channel processing method according to claim 7, wherein the determining a time interval between a first channel and a second channel based on the timing parameter, comprises:

determining, by the terminal, time corresponding to the second number to be the time interval.

9. The channel processing method according to claim 7, wherein the second number is the minimum number of transmission time units between the at least one of the at least one first transmission time unit and the at least one of the at least one second transmission time unit.

10. The channel processing method according to claim 1, wherein:

the first channel is a PDSCH, and the second channel is a PDCCH; or the first channel is a PUSCH, and the second channel is the PDCCH; or the first channel is a PUCCH, and the second channel is the PDSCH.

11. A channel processing method, comprising:

determining, by a network device, a timing parameter in DCI;

determining, by the network device, a time interval between a first channel and a second channel based on the timing parameter, the first channel corresponding to at least one transmission time unit and the second channel corresponding to at least one transmission time unit; and determining, by the network device, a transmission time unit of the first channel based on the time interval;

wherein the determining a time interval between a first channel and a second channel based on the timing parameter, comprises:

determining, by the network device, a time interval between at least one first transmission time unit of the at least one transmission time unit corresponding to the first channel and at least one second transmission time unit of the at least one transmission time unit corresponding to the second channel based on the timing parameter;

wherein the at least one first transmission time unit is the first transmission time unit of the at least one transmission time unit corresponding to the first channel, and the at least one second transmission time unit is the last transmission time unit of the at least one transmission time unit corresponding to the second channel.

12. The channel processing method according to claim 11, further comprising: determining, by the network device, the at least one transmission time unit corresponding to the second channel based on transmission information of the second channel.

13. The channel processing method according to claim 12, wherein the determining a transmission time unit of the first channel based on the time interval, comprises:

determining, by the network device, the transmission time unit of the first channel based on the time interval and the transmission information of the second channel.

14. The channel processing method according to claim 13, wherein the transmission information of the second channel comprises:

a first number of the at least one transmission time unit corresponding to the second channel; and the first transmission time unit in the at least one transmission time unit corresponding to the second channel; and the determining the transmission time unit of the first channel based on the time interval and the transmission information of the second channel, comprises:

determining, by the network device, the at least one second transmission time unit based on the first number and the first transmission time unit in the at least one transmission time unit corresponding to the second channel;

determining, by the network device, at least one of the at least one first transmission time unit based on the time interval and at least one of the at least one second transmission time unit; and determining, by the network device, the at least one of the at least one first transmission time unit to be the transmission time unit of the first channel.

15. The channel processing method according to claim 14, wherein the determining at least one of the at least one first transmission time unit based on the time interval and at least one of the at least one second transmission time unit, comprises:
   determining, by the network device, whether a determined transmission time unit based on the time interval and the at least one of the at least one second transmission time unit belongs to a time unit set;
   determining, by the network device, the determined transmission time unit to be the at least one of the at least one first transmission time unit, in response to the determined transmission time unit belonging to the time unit set; and
   determining, by the network device, a transmission time unit after the determined transmission time unit, which belongs to the time unit set, to be the at least one of the at least one first transmission time unit, in response to the determined transmission time unit not belonging to the time unit set.

16. The channel processing method according to claim 14, further comprising:
   obtaining, by the network device, the first transmission time unit in at least one transmission time unit corresponding to a PDCCH through a high-layer signaling and/or the DCI, in response to the first channel being a PDSCH and the second channel being the PDCCH, or the first channel being a PUSCH and the second channel being the PDCCH; and/or
   determining, by the network device, the first transmission time unit in at least one transmission time unit corresponding to a PDSCH, based on a time interval between the last transmission time unit in at least one transmission time unit corresponding to a PDCCH and the first transmission time unit in the at least one transmission time unit corresponding to the PDSCH and transmission information of the PDCCH, in response to the first channel being a PUCCH and the second channel being the PDSCH.

17. The channel processing method according to claim 14, further comprising:
   obtaining, by the network device, the first number through a high level signaling and/or the DCI.

18. The channel processing method according to claim 11, wherein:
   the DCI carried by a PDCCH comprises the timing parameter;
   the second number of transmission time units are present between at least one of the at least one first transmission time unit and at least one of the at least one second transmission time unit;
   wherein timing parameters in DCIs carried by the PDCCH in at least two transmission time units are identical, and the timing parameter is the second number; or
   timing parameters in DCIs carried by the PDCCH in at least two transmission time units are different, and the second number is determined based on at least one of the different timing parameters.

19. The channel processing method according to claim 18, wherein the determining a time interval between a first channel and a second channel based on the timing parameter, comprises:
   determining, by the network device, time corresponding to the second number to be the time interval.

20. The channel processing method according to claim 18, wherein the second number is the minimum number of transmission time units between the at least one of the at least one first transmission time unit and the at least one of the at least one second transmission time unit.

21. An electronic device, comprising:
   a memory and a processor;
   wherein the memory has a computer program stored therein;
   wherein the processor is configured to run the computer program to perform operations, including:
      receiving, by a terminal, downlink control information (DCI) and determining a timing parameter in the DCI;
      determining, by the terminal, a time interval between a first channel and a second channel based on the timing parameter, the first channel corresponding to at least one transmission time unit and the second channel corresponding to at least one transmission time unit; and
      determining, by the terminal, a transmission time unit of the first channel based on the time interval; or
   the processor is configured to run the computer program to perform operations of:
      determining, by a network device, a timing parameter in DCI;
      determining, by the network device, a time interval between a first channel and a second channel based on the timing parameter, the first channel corresponding to at least one transmission time unit and the second channel corresponding to at least one transmission time unit; and
      determining, by the network device, a transmission time unit of the first channel based on the time interval;
   wherein the determining a time interval between a first channel and a second channel based on the timing parameter, comprises:
      determining, by the terminal, a time interval between at least one first transmission time unit of the at least one transmission time unit corresponding to the first channel and at least one second transmission time unit of the at least one transmission time unit corresponding to the second channel based on the timing parameter;
   wherein the at least one first transmission time unit is the first transmission time unit of the at least one transmission time unit corresponding to the first channel, and the at least one second transmission time unit is the last transmission time unit of the at least one transmission time unit corresponding to the second channel.

* * * * *